United States Patent
Cimaglio et al.

(10) Patent No.: US 8,975,321 B2
(45) Date of Patent: Mar. 10, 2015

(54) COMPOSITIONS SUITABLE FOR USE AS JOINT COMPOUNDS AND RELATED METHODS

(75) Inventors: Scott D. Cimaglio, Antioch, IL (US); Charles D. Byers, Naperville, IL (US); Charles J. Miller, McHenry, IL (US)

(73) Assignee: United States Gypsum Company, Chicago, IL (US)

(*) Notice: Subject to any disclaimer, the term of this patent is extended or adjusted under 35 U.S.C. 154(b) by 1031 days.

(21) Appl. No.: 12/134,674

(22) Filed: Jun. 6, 2008

(65) Prior Publication Data

US 2008/0305252 A1    Dec. 11, 2008

Related U.S. Application Data

(60) Provisional application No. 60/942,761, filed on Jun. 8, 2007.

(51) Int. Cl.

| | |
|---|---|
| *C08K 3/26* | (2006.01) |
| *C04B 14/00* | (2006.01) |
| *B32B 43/00* | (2006.01) |
| *C04B 26/02* | (2006.01) |
| *C04B 26/04* | (2006.01) |
| *C04B 28/14* | (2006.01) |
| *B32B 38/00* | (2006.01) |
| *C04B 111/00* | (2006.01) |
| *C04B 111/10* | (2006.01) |

(52) U.S. Cl.
CPC .............. *B32B 43/00* (2013.01); *C04B 26/02* (2013.01); *C04B 26/04* (2013.01); *C04B 28/145* (2013.01); *B32B 2038/002* (2013.01); *B32B 2309/02* (2013.01); *B32B 2309/04* (2013.01); *B32B 2607/00* (2013.01); *C04B 2111/00681* (2013.01); *C04B 2111/00689* (2013.01); *C04B 2111/1006* (2013.01)
USPC .......................................... 524/425; 106/401

(58) Field of Classification Search
USPC ................... 524/423, 425; 106/401
See application file for complete search history.

(56) References Cited

U.S. PATENT DOCUMENTS

| | | | |
|---|---|---|---|
| 4,294,622 A | 10/1981 | Brown | |
| 4,661,161 A | 4/1987 | Jakacki et al. | |
| 5,746,822 A | 5/1998 | Espinoza et al. | |
| 5,779,786 A * | 7/1998 | Patel | 106/781 |
| 6,228,163 B1 * | 5/2001 | Espinoza et al. | 106/778 |
| 6,436,185 B1 | 8/2002 | Ayambem et al. | |
| 7,045,008 B2 * | 5/2006 | Langford | 106/504 |
| 7,686,879 B2 * | 3/2010 | Grochal et al. | 106/287.19 |
| 2005/0056187 A1 * | 3/2005 | Podlas | 106/15.05 |
| 2005/0235878 A1 | 10/2005 | Podlas | |
| 2006/0159908 A1 | 7/2006 | Houck et al. | |
| 2006/0270758 A1 | 11/2006 | Ong et al. | |
| 2007/0277948 A1 * | 12/2007 | Carbo et al. | 162/145 |

FOREIGN PATENT DOCUMENTS

| | | |
|---|---|---|
| CA | 2205668 | 11/1997 |
| EP | 0427064 A2 | 5/1991 |
| GB | 2140794 A | 12/1984 |
| JP | 59-227965 A | 12/1984 |
| JP | 06-172688 A | 6/1994 |
| JP | 06-287544 A | 10/1994 |
| JP | 08-060139 A | 3/1996 |
| JP | 10-067929 A | 3/1998 |
| JP | 10-121021 A | 5/1998 |
| JP | 2002-531369 A | 9/2002 |
| JP | 2003-171493 A | 6/2003 |
| JP | 2003/183064 A | 7/2003 |
| JP | 2004-506107 A | 2/2004 |
| WO | WO 97/02395 | 1/1997 |
| WO | WO 00/34200 | 6/2000 |
| WO | WO 2005/014256 | 2/2005 |
| WO | WO 2005/028585 | 3/2005 |
| WO | WO 2005/100279 A1 | 10/2005 |

OTHER PUBLICATIONS

European Extended Search Report from EP Appln. 08770323.7 (Apr. 12, 2012).
Machine English Translation of Abstract and Claims of EP 0427064 A2 (May 15, 1991).

* cited by examiner

*Primary Examiner* — Yong Chu
*Assistant Examiner* — Sonya Wright
(74) *Attorney, Agent, or Firm* — Greer, Burns & Crain, Ltd.; Pradip Sahu; Philip T. Petti

(57) ABSTRACT

The invention provides a composition useful as a joint compound comprising water, a filler comprising one or more of calcium carbonate, calcium sulfate dihydrate or calcium sulfate hemihydrate, a binder and/or a biocide, wherein the composition after curing is formaldehyde-free.

14 Claims, No Drawings

COMPOSITIONS SUITABLE FOR USE AS JOINT COMPOUNDS AND RELATED METHODS

CROSS-REFERENCE TO RELATED APPLICATIONS

This application claims priority to and the benefit of U.S. Provisional Patent Application No. 60/942,761, filed Jun. 8, 2007, which is incorporated by reference.

BACKGROUND OF THE INVENTION

Joint compounds are commonly used to fill and smooth the joints between abutting edges of adjacent gypsum wallboards and to patch damaged wallboard. Typically, joint compounds are applied to the aforesaid joints or wallboard, often over a tape or mesh support, in a manner that hides the joints or damage, thereby providing a smooth and uniform appearance thereto.

Generally, there are two types of joint compounds: dry and ready-mix. Dry joint compounds, as their name implies, require the addition of water to their dry components prior to use. After the addition of water, this type of joint compound must be used relatively quickly, within minutes to hours, and cannot be stored in a wetted condition. In contrast, water is added to the components of ready-mix compounds during manufacturing, providing compounds that may be stored in a wetted state for months until needed. Ready-mix compounds are thus preferred by many users because they require little or no water to be added to the compound prior to use.

Ready-mix compounds may be conveniently segregated into two groups based on their method of cure: drying type and setting type. Drying type compounds cure upon the loss of water due to evaporation, while setting type compounds cure as a result of a chemical reaction that occurs between calcined gypsum (calcium sulfate hemihydrate) and water. While the ready-mix compounds contain water, the hydration reaction in the setting type compounds is inhibited by the inclusion therein of a set retardant. The inhibiting effect of the set retardant is commonly overcome by the addition of an activator to the uncured setting type compound just prior to use, whereby the curing of the compound is initiated.

While existing ready-mix joint compounds provide certain acceptable properties and performance, a need exists for joint compounds which provide enhanced properties and/or performance relative to existing compounds.

BRIEF SUMMARY OF THE INVENTION

The invention meets the foregoing and other needs by providing, in one aspect, a composition comprising water, a filler which comprises one or more of calcium carbonate, calcium sulfate dihydrate or calcium sulfate hemihydrate, a binder and/or biocide, wherein the composition is formaldehyde-free after curing. Methods of using these compositions, and the formaldehyde-free cured compositions per se, also are contemplated by the invention.

DETAILED DESCRIPTION OF THE INVENTION

The invention provides in one aspect compositions suitable for use as joint or patching compounds that are formaldehyde-free after curing. The compositions may be ready-mix (pre-mixed with water by a manufacturer and stored over substantial period of time prior to use), and may be either the drying type or the setting type.

In this aspect, the invention comprises water, a filler which comprises one or more of calcium carbonate, calcium sulfate dihydrate or calcium sulfate hemihydrate, a binder and/or a biocide, wherein the composition is formaldehyde-free after curing.

As used herein, the term "formaldehyde-free" means a composition which, after curing, releases or emits formaldehyde at a level that is below certain quantifiable limits established by the testing protocols as described herein. For a composition to be "formaldehyde-free," the amount of formaldehyde released or emitted from a sample of the cured composition is no more than about 16 µg m$^{-3}$ (13.5 ppb), desirably no more than about 10 µg m$^{-3}$ (8.2 ppb), more desirably no more than about 5 µg m$^{-3}$ (4.1 ppb), and most desirably no more than about 2 µg m$^{-3}$ (1.6 ppb), after 96 hours of chamber testing. Desirably these levels are obtained after 48 hours of chamber testing, and more desirably after 24 hours of chamber testing.

The test protocol for determining whether a cured composition is formaldehyde-free in the context of the invention includes both sample preparation and procedures for analyzing the sample for formaldehyde release or emission.

To prepare a sample for analysis, a template (frame) is provided which permits the composition to be cast within its inner dimensions (150 mm$^2$) at a thickness of 1.57 mm. The template may consist of any rigid non-formaldehyde-emitting material, and preferably of a metal such as brass or aluminum. The template is then placed over relatively larger non-formaldehyde-emitting substrate (e.g., glass, aluminum, brass). Thereafter, the composition may be applied into the cavity formed by the template-substrate combination as follows.

For testing a ready-mix composition, the composition is thoroughly mixed, and then removed from the container and applied in an amount sufficient to fill the aforementioned cavity (with excess being scraped off and discarded to provide a level finish across the surface of the template). For testing a dry composition, clean tap water is added to the dry material in accordance with manufacturer's recommendations to form a wet composition, with the wet composition also being applied in an amount sufficient to fill the cavity as described herein.

Thereafter, the sample is allowed to dry at least 24 hours at 23±2° C. and 50±10% relative humidity (while ventilated with clean air) until the sample reaches a constant weight. To address any sample shrinkage and reduce as much as possible any increase in surface area of the sample due to cracking, additional (wet) composition is applied over the dry sample (with excess again being scraped off and discarded to provide a level surface across the surface of the template). The sample is again allowed to dry at least 24 hours at 23±2° C. and 50±10% relative humidity (while ventilated with clean air) until the sample reaches a constant weight. The edges of the substrate and template are then sealed with aluminum tape so no other surfaces are exposed. The resulting sample is then conditioned for 10 days at 23±2° C. and 50±10% relative humidity (RH). The resulting conditioned sample of the cured composition may be analyzed to determine whether it is formaldehyde-free in the context of the present invention, as set forth below.

The principle of the analysis is to determine the specific emission rates of formaldehyde emitted from a conditioned sample of a subject composition over a period of time. The first step of the analysis, which may be referred to as the chamber test, is conducted in a small-scale environmental chamber at specified constant conditions of temperature, relative humidity, ventilation rate and product loading factor.

The following table lists the chamber conditions for the 96 hour chamber test period.

| Parameter | Symbol | Units | Value |
|---|---|---|---|
| Chamber volume | V | $m^3$ | 0.05 – 0.10 |
| Loading factor | L | $m^2 \, m^{-3}$ | 0.5 ± 0.2 |
| Air change rate | a | $h^{-1}$ | 1.0 ± 0.05 |
| Area specific flow rate | $q_A$ | $m \, h^{-1}$ | 1.4 – 3.3 |
| Temperature | T | ° C. | 23 ± 1 |
| Relative humidity | RH | % | 50 ± 5 |

Standard conditions for the purpose of calibrating flow measurement devices and calculating all flow rates shall be 25° C. (298° K.) and one atmosphere pressure (101.3 kPa). The chamber volume shall be between 50 L and 100 L. The chamber shall be ventilated at 1±0.05 air changes per hour. The loading factor shall be optimized to produce an area specific flow rate approximately equal to the area specific flow rate for the product in the modeled scenarios (standardized building scenarios, school classroom scenario, and office space scenario). The central value of 0.5 $m^2$ of exposed specimen surface area per $m^{-3}$ chamber volume results in an area specific flow rate of 2 $m^3 \, h^{-1} \, m^{-2}$ ($m \, h^{-1}$), which is close to the value for many materials in both the classroom and office building scenarios. A loading factor of 0.3 to 0.7 $m^2 \, m^{-3}$ is allowed for all materials. Specimen sizes are to be adjusted according to the chamber volume to achieve the specified loading factors.

The chamber test is run for 96 hours. Sealing of the chamber lid following insertion of the conditioned sample into the chamber establishes the zero time for the start of the test.

The apparatus and facilities are constructed to maintain the test sample at the specified conditions within a non-contaminating and low sorption environment. A clean air generator or high purity air cylinders is used to supply pressurized clean, dry air. The flow rate of the supply air to a chamber is regulated and monitored with electronic mass flow controllers (MFCs), or equivalent, with an accuracy of ±2% at 1 Lpm, or better, and capable of continuously maintaining the flow within ±5% of the specified value. As the humidity of the supply air is maintained by mixing dry and saturated gas streams, generally two mass flow controllers are required per chamber (i.e., one for the dry stream and one for the wet stream). The dry and wet streams are mixed before the supply air enters the chamber.

The chamber volume is between 50 L and 100 L. The chamber is constructed of stainless steel or glass. Stainless steel chambers shall have electro-polished, or equivalent, interior surfaces. Either rectangular or cylindrical shapes are acceptable. The chamber is designed as a single-pass system without recirculation of chamber air. The chamber is operated at a slight positive pressure relative to the room to prevent the entrainment of room air. The chamber inlet and exhaust shall be positioned and designed to ensure complete mixing of chamber air. The chamber lid should have a non-contaminating, non-sorbing gasket and a closure mechanism to create an airtight seal. Other materials introduced into to the chamber (e.g., racks and probes) are constructed of non-contaminating materials such as stainless steel or glass.

Background concentrations of formaldehyde in the empty chamber ventilated at 1.0 air changes per hour should not exceed 2 $\mu g \, m^{-3}$. The temperature of the chamber is maintained at 23±1° C. throughout the 96-h test. The humidity of the chamber air shall be maintained at 50±10% RH. The RH of the chamber air should be nearly equivalent to the RH of the inlet air. The humidity can be established by controlling the humidity of the inlet air, as previously discussed.

Chamber background measurements are made on a regular basis. At a minimum, the background of aldehydes should be determined prior to each third use of the chamber. Aldehyde samples are to be collected to provide lower quantification limit of at least 2 $\mu g \, m^{-3}$ for formaldehyde.

Conditioned samples are taken directly from the conditioning facility (10 day controlled conditions: 23±2° C. and 50±10% RH) and placed in a clean test chamber minimizing the time the specimen is exposed to laboratory air. Generally, this time should not exceed 15 minutes. In a rectangular chamber with flat surfaces, the specimen may be placed directly on the floor of the chamber without additional support. In a horizontally oriented cylindrical chamber, a wire rack is used to hold the specimen near the midpoint of the chamber. A wire rack may also be used in a rectangular chamber. There should be sufficient space for chamber air to circulate freely around the exposed face of the specimen. The specimen loading factor is 0.3-0.7 $m^2 \, m^{-3}$.

The air leakage of the chamber is determined immediately after loading a conditioned test sample. This is accomplished by measuring the flow rate at the chamber exhaust and comparing this to the supply airflow rate. The flow measurement device should have low pressure drop. Bubble flow meters and low-pressure drop rotameters are suitable for use. The exhaust flow rate should be within 10% of the inlet flow rate by this method.

At 24 hours and 48 hours, samples of chamber air for formaldehyde analyses are collected. These first measurements of formaldehyde concentration, when compared to the corresponding 96 hour measurements, may be used to determine whether the chamber formaldehyde concentrations remained relatively constant or declined slowly throughout the test. Temporal variations or fluctuations outside of the normally expected range (e.g., ±25%) likely indicate that a test parameter was uncontrolled or an analysis was incorrect.

Sampling media for formaldehyde should consist of cartridges containing a solid support material (e.g., silica gel) treated with an acid solution of 2,4-dinitrophenylhydrazine (DNPH) as a derivatizing reagent. These sampling cartridges should be warmed to room temperature prior to use.

Sampling flow rates are regulated with electronic mass flow controllers, or equivalent, with an accuracy of ±2% full scale, or better, and capable of continuously maintaining the flow during sampling within ±5% of the specified value. Chamber air samples are collected directly from the chamber exhaust into the aforementioned sampling cartridges at the specified elapsed times. The total sampling flow rate at any time should not exceed 75% of the inlet flow rate.

Following collection, the sealed sampling cartridges representing the chamber air are sealed in clean airtight containers. These containers may be stored at reduced temperature in a dedicated refrigerator or freezer. Samples should be analyzed as soon as practical after collection.

In the second step, the sampling cartridges are analyzed using instrumental methods that are capable of positively identifying formaldehyde and quantifying formaldehyde using multi-point calibrations prepared using pure standards. The methods provide sufficient sensitivity and accuracy to reliably quantify individual formaldehyde at concentrations of 2 $\mu g \, m^{-3}$, or less, of chamber air.

The sampling cartridges are analyzed by HPLC equipped with a UV detector and an analytical column providing full resolution of the formaldehyde hydrazone derivative from unreacted DNPH in a sample. The analytical methods for formaldehyde should be based on ASTM Standard D 5197-

97, "Standard Test Method for Formaldehyde and other Carbonyl Compounds in Air (Active Sampler Methodology)" or an equivalent method. Aldehydes analyzed by HPLC are quantified based on multi-point calibrations prepared from hydrazone derivatives of the pure compounds. Standards and samples are analyzed using identical methods. At least one standard is analyzed with each batch of samples.

A lower limit of quantification (LOQ) often is quantitatively defined as the analyte mass that produces a response that is 10 times higher than the instrumental noise level or is 10 times the standard deviation for repeated analyses of a low level standard. A lower LOQ that is higher than this absolute value may be defined based on practical considerations. The lower LOQ for formaldehyde is 2 µg m$^{-3}$, or better.

Since the chamber measurements are made starting on the 11th day and ending on the 14th day after conditioning of the test sample (24-h, 48-h and 96-h sampling time points following a 10-day conditioning period), chamber concentrations are expected to change slowly with time. Thus, the steady state form of the mass-balance equation is used for analysis of the chamber data. The emission factor (EF) in µg m$^{-2}$ h$^{-1}$ for a chemical substance in a chamber test is calculated using Equation 1:

$$EF = Q \times (C - C_0)/A_C \quad (1)$$

where C is the chamber concentration of the substance (µg m$^{-3}$) and $C_0$ is the corresponding substrate or chamber blank concentration (µg m$^{-3}$). Q is the inlet flow rate (m$^3$ h$^{-1}$), which is the measured flow rate of air into the chamber. The exposed projected surface area of the test specimen in the chamber, $A_C$ (m$^2$), is determined from the measurements made at the time of specimen preparation. A chamber concentration in ppb (molar basis) for an individual VOC (in this case, formaldehyde) is calculated from the chamber concentration (C−$C_0$) in µg m$^{-3}$ using Equation 2:

$$\text{Chamber concentration (ppb)} = (C - C_0) \times 24.45/MW \quad (2)$$

where 24.45, in L/mol, is the molar volume of air at standard conditions (1 atm pressure, 25° C.). This value represents the amount of formaldehyde released or emitted from a subject composition after curing (i.e., after sample preparation and conditioning, subjecting the conditioned sample to the chamber test, and analyzing a sample of the chamber air for formaldehyde content, all as described herein). It is contemplated that the amount of formaldehyde in the chamber air released or emitted from the composition after curing should meet the formaldehyde concentration levels described herein at 96 hours from the start of chamber testing, desirably at 48 hours from the start of chamber testing, and more desirably at 24 hours from the start of chamber testing.

In accordance various aspects of the invention, binders and/or biocides are included in the uncured compositions, with the inclusion of both components being preferred. Any binder capable of enhancing the adhesion of the composition to a substrate after curing may be used, and any biocide capable of inhibiting the growth of an assortment of living organisms during transport and/or storage of the composition may be used. It was discovered, however, that certain commercially-available binders and biocides were manufactured with formaldehyde or were capable of emitting formaldehyde either alone, as a result of the inclusion of other components in the composition (e.g., during manufacturing or storage), or during curing. Thus, in one aspect, the invention provides cured compositions that are formaldehyde-free, and which are desirably prepared using formaldehyde-free binders, formaldehyde-free biocides, and which preferably include both such binders and biocides.

Binders, biocides and other components that are formaldehyde-free may be identified by use of the following protocol. About 1 gram of the component to be tested is added to 10 mL water in a 20 mL headspace vial, and the vial is then mixed. The mixture is sealed and heated at 60° C. for 30 minutes. The liquid from the 60° C. treatment is then added to a 20 mL headspace vial and deionized (DI) water is added to provide a total of 10 mL. Next, 1 mL of o-(2,3,4,5,6-pentafluorobenzyl)-hydroxylamine (PFBOA) reagent (0.020 g in 100 mL DI water) is added to each vial along with 3 g NaCl and the vial is capped. The vial is shaken (500 rpm) at 60° C. for 30 minutes, and 1 ml of the PFBOA-aldehyde headspace gas was analyzed and compared to standards. Standard formaldehyde solution available from Sigma-Aldrich (ACS reagent, 37% wt. in water). The following table provides the operational conditions of GC/MS and headspace autosampler used to test components:

| GC/MS | |
|---|---|
| Column | PTE-5 ™ of Spelco (Bellfonte, USA), FUSED SILICA capillary column 30 m × 0.25 mm × 0.25 µm film thickness |
| Oven temperature | 60° C. (2 min) → 7° C./min → 150° C. → 15° C./min → 220° C. |
| Carrier gas | He 16 psi |
| Injection temperature | 200° C. |
| Ionization voltage | 70 eV |
| Ion Source temperature | 200° C. (electron ionization (EI)), 150° C. (negative chemical ionization (NCI)) |
| CI gas | Iso-butane (purity 99.99%) |
| Headspace autosampler | |
| Needle temperature | 120° C. |
| Pressurization time | 1 min |
| Transfer temperature | 180° C. |
| Pressure of He | 20 psi |
| Thermostatic temperature | 60° C. |
| Thermostatic time | 60 min |
| Injection time | 0.08 min |

Retention time for PFBOA formaldoximes is 6.47 and SIM monitor ions by electron ionization (EI) are 181 and 195 and by negative chemical ionization (NCI) are 181, 205, and 225. For a binder, biocide, and other component to be formaldehyde-free, the amount of formaldehyde released or emitted from the component is at least below about 250 µg m$^{-1}$, desirably below about 100 µg m$^{-1}$, and more desirably below about 50 µg m$^{-1}$.

Any of a number of binders may be suitable for use in the various aspects of the invention either alone or in combination to provide the inventive formaldehyde-free cured compositions, including, for example, vinyl-, acrylic- and styrene-containing compounds, polymers or copolymers thereof and starches. Illustrative of binders that may be suitable for use include, but are not limited to, polyvinyl acetates, polyvinyl alcohols, (meth)acrylic polymers (e.g., polyvinyl acrylics), ethylene vinyl acetate polymers, vinyl chloride polymers, styrene acrylic polymers, polystyrenes, polyacrylamides, styrenebutadiene, natural and synthetic starches (including pregelatinized starches) and casein. Latex binders are the preferred binders, and are more preferably provided as emulsions (dispersions). Examples of suitable latex binders include ethylene vinyl acetate or polyvinyl acetate emulsions. Illustrative of preferred polymer latex emulsions for use in the present invention which are also formaldehyde-free are Ray-Vace® 45030 (Specialty Polymers, Inc.) and Fullatex PD0722A (H.B. Fuller Co.).

The binder may be included in the uncured compositions in any amount suitable to provide the desired degree of adhesion of the compositions to a substrate (e.g., wallboard) after curing. The amount of binder in the uncured compositions desirably may range from about 0.1 wt. % to about 15 wt. %, more desirably from about 0.5 wt. % to about 10 wt. %, and preferably from about 1 wt. % to about 8 wt. % of the composition.

Biocides suitable for use in the inventive compositions inhibit the growth of an assortment of living organisms, including mold/mildew, fungi, yeast, algae, and bacteria during transport and/or storage of the inventive ready-mix compositions. Thus, and by way of example, biocides may include anti-microbial agents, anti-fungal agents, anti-bacterial agents, and the like.

While any of a number of biocides may be used either alone or in combination to provide the inventive formaldehyde-free cured compositions, desirably one or more formaldehyde-free biocides is used. Of these, isothiazolinones are preferred, with isothiazolin-3-ones being even more preferred. When isothiazolinones are used, those having a $C_1$-$C_8$ moiety are preferred, with methylisothiazolinone, benzylisothiazolinone, octylisothiazolinone and mixtures thereof being most preferred. In addition, and while not required, it is also desirable that the isothiazolinones are non-halogenated.

Illustrative of suitable isothiazolinone-containing formaldehyde-free biocides include isothiazolin-3-ones such as 1,2-benzisothiazolin-3-one available as Proxel® GXL or Proxel® CRL (ARCH Chemicals), Nalcon® 200 (Nalco), Canguard™ BIT (Dow Chemical), Rocima™ BT 1S (Rohm & Haas), Nuosept® 498 (International Specialty Products); Acticide® 45 and Acticide® OTW (octylisothiazolinone; Acticide® OTW being provided as an aqueous dispersion with zero VOCs) (Acti-Chem); Acticide® B10/B20 and Acticide® BW10/BW20 (benzisothiazolinone; Acticide® BW10/BW20 having zero VOCs) (Acti-Chem); Acticide® CT and Acticide® LG (aqueous blends of chlorinated and non-chlorinated isothiazolinones with zero VOCs) (Acti-Chem); and Acticide® MBS (blends of 1,2-benzisothiazolin-3-one and 2-methyl-4-isothiazolin-3-one) (Acti-Chem).

Additional isothiazolin-3-ones include 5-chloro-2-methyl-4-isothiazolin-3-one, 2-methyl-4-isothiazoline-3-one, and blends thereof, such blends being available as Kathon™ LX (Rohm & Haas), Mergal® K14 (Troy Chemical), and Amerstat® 251 (Drew Chemical). Another suitable isothiazolin-3-one is 2-n-octyl-4-isothiazolin-3-one, available as Kathon™ 893 (Rohm & Haas).

Other suitable formaldehyde-free biocides include zinc 1-hydroxy-2(1H)-pyridinethione, available as Zinc Omadine® (ARCH Chemicals), which preferably may by used with zinc oxide, Skane® M-8 (Rohm & Haas), and 2-(4-thiazolyl)-benzimidazole, available as Metasol® TK-100 (LanXess).

Desirably, the compositions may include one or more biocides of the type and in an amount which provide the uncured compositions with a fungal resistance of at least about 2 (11-39 average colonies), more preferably a fungal resistance of at least about 1 (<10 average colonies), and most preferably a fungal resistance of at least about 0 (0 average colonies). The following equipment is needed to test for fungal resistance: an optical microscope, 2 week slants, PDA agar plates, sterilized water in 100 mL bottles, a hemacytometer, and plastic loops. The following procedure should be used to test fungal resistance for each strain (*A. Niger* and *A. Oryzae*) by using sterile technique. Pipet 4 mL of sterilized DI water into each of the 2 slants. Loosen spores from agar surface using plastic loop. Repeat for all slants to be tested. Mix all slants for around 20 seconds on a touch mixer until suspended. Add inoculum to the sterilized DI water in the 100 ml bottles with a disposable 1 mL pipet and shake vigorously. Place one drop of dilution on one ramp of the hemacytometer and count the spores by observing the grid through the optical microscope. Adjust to the proper concentration (100±20 cells in the entire grid ($1\times10^6$ cells per mL)) with more water or inoculum. To an empty sterilized water bottle and add required mLs (1 cc needed for each ½ pint container) of each strain and shake vigorously. Add 1 mL aliquot of suspension to 100 grams of composition, mix using sterilized wooden depressor, swab PDA plate, and place plates in incubator set at 37° C. Swab TSA plate with inoculum for sterility verification. Plate at 24 hrs, 48 hrs, and 7 days. Re-inoculate at 7 days and plate at 48 hrs. Read plates 3 to 5 days after plating.

Preferably, the compositions may further include one or more biocides of the type and in an amount that provide the uncured compositions with bacterial resistance of at least about 3 (40-100 average colonies), more preferably a bacterial resistance of at least about 2 (11-39 average colonies), and most preferably a bacterial resistance of at least about 1 (<10 average colonies).

The following equipment is needed to test for bacterial resistance: a spectrophotometer, 24 hr slants, TSA agar plates, sterilized DI water in 100 ml bottles, test tubes, plastic loops, and metal loops. The spectrophotometer should be warmed up for more than 20 minutes at the appropriate wavelength (650-900 nm). Calibrate spectrophotometer to zero (blank cell). Fill a cell with sterile water, clean outer surface of cell, and calibrate spectrophotometer to 100% light transmittance. The following procedure should be used to test bacterial resistance by using sterile technique. Pipet 4 mL of sterilized DI water into each of the 4 slants (*P. aeruginosa, E. aerogenes, E. coli*, and *B. subtilus*). Loosen spores from agar surface using sterilized inoculating loop. Re-sterilize loop and repeat for all slants. Mix slants on touch mixer until suspended (around 20 seconds). Add separate inoculum to each of the four sterilized 100 mL bottles with a disposable 1 mL pipet. Shake each bottle vigorously. Add sample to clean vial and test the transmittance of the sample (required light transmittance range is from about 85% to about 88% for the proper concentration of $1\times10^6$ cells per mL). Adjust to the proper concentration ($1\times10^6$ cells per mL) with more water or inoculum. These steps should be repeated for each strain to be tested. To an empty sterilized water bottle, add needed mLs (1 cc needed for each ½ pint container) of each strain and shake vigorously. Next, add 1 mL aliquot of suspension to 100 grams of composition and stir using sterilized wooden depressor. Swab TSA plate, and place in incubator set at 24° C. Swab TSA plate with inoculum for sterility verification. Plate onto TSA at 24 hrs, 48 hrs, and 7 days. Re-inoculate at 7 days and plate at 48 hours. Read plates 1 or 2 days after plating.

Generally, the foregoing performance may be obtained by the inclusion of one or more biocides, preferably the isothiazolinones described herein, in an amount ranging from about 0.01 wt. % to about 5 wt. %, preferably from about 0.1 wt. % to about 3 wt. %, and most preferably from about 0.2 wt. % to about 2 wt. % of the composition.

The inventive compositions further include a filler. Examples of fillers suitable for inclusion in the composition include one or more of limestone, dolomite, calcium magnesium carbonate, calcium carbonate, calcium sulfate dihydrate or calcium sulfate hemihydrate. The types and amounts of fillers used will depend on the type of composition that is being prepared. When the composition to be prepared is a drying type, the filler desirably comprises calcium carbonate, calcium sulfate dihydrate or mixtures thereof, preferably in an amount ranging from about 20 wt. % to about 95 wt. %, and further is substantially free (no more than about 5 wt. %, preferably no more than about 3 wt. %, and more preferably no more than about 1 wt. %) of calcium sulfate hemihydrate, based on the weight of the composition. In setting type compositions, the filler desirably comprises calcium sulfate hemihydrate, preferably in an amount ranging from about 40 wt. % to about 90 wt. % of the composition, and may further include, e.g., calcium carbonate and calcium sulfate dihydrate, preferably in an amount ranging from about 0.1 wt. % to about 30 wt. %, all based on the weight of the composition.

The inventive setting type compositions desirably comprise a set retardant. As its name implies, this component inhibits the reaction between the calcium sulfate hemihydrate and water during manufacture and storage of the setting type compositions. The set retardants may be used individually or in combination so long as neither the individual retardant, nor the combination of retardants employed, emits or generates formaldehyde after curing.

Set retardants are well known in the art, and any set retardant capable of delaying the curing of the composition may be used. The set retardant may comprise organic or inorganic materials. Illustrative of suitable organic materials are citric acid, proteinaceous retarders (e.g., available from Industrial SUMA, Brazil) or mixtures thereof. Illustrative of inorganic materials are non-calcium-bearing phosphates. Preferably, the amount of set retardant in the uncured composition may range from about 0.01 wt. % to about 10 wt. %, and more preferably from about 0.5 wt. % to about 5 wt. % of the composition.

Water is another component of the inventive compositions. Those skilled in the art are aware of the amount of water that is desirably present in the compositions. Generally, in a setting composition, the amount of water should be that which is sufficient to react with the amount of calcium sulfate hemihydrate present therein, with some additional water being added to provide, in combination with other ingredients present, the desired workability to the composition. In drying type compositions, the amount of water also should be that which, in combination with other components present therein, provides the desired workability to the composition. In this regard, the amount of water may vary, but is desirably present in an amount which provides the composition with a viscosity desirably ranging from about 10,000 cps to about 80,000 cps, and more desirably from about 20,000 cps to about 60,000 cps.

The setting type compositions also require the addition of a set accelerator just prior to use. This component, as its name implies, negates the inhibiting effect of the set retardant on the calcium sulfate hemihydrate and water reaction, and permits curing to commence. One or more set accelerators may be used so long as neither the individual accelerator, nor the combination of accelerators, emits or generates formaldehyde after curing.

Set accelerators are well known in the art, and any set accelerator capable of assisting in initiating the curing of the composition may be used. Illustrative of suitable set accelerators include, for example, zinc salts or sulfate salts. The set accelerator may be included in the composition in varying amounts, but is desirably sufficient to ensure that curing of the composition is initiated and completed. Preferably, the amount of set accelerator in the uncured compositions may range from about 0.1% to about 10% by weight, and more preferably from about 0.1 wt. % to about 2 wt. % of the composition. Absent this component, the inventive setting type compositions may be used as drying type compositions.

Other additives, as will be appreciated by one of ordinary skill in the art, also may be included in the compositions of the invention. For example, a lightweight filler may be used where the weight of the compound is important. Illustrative of suitable lightweight fillers include perlite or expanded perlite. Use of expanded perlite in a lightweight joint compound is taught in U.S. Pat. No. 4,454,267. Because expanded perlite contains many cracks and fissures, it is preferable to pre-treat this material in accordance with the teachings of U.S. Pat. No. 4,525,388, so that the material does not increase in weight due to water absorbed by capillary action. Preferably, the perlite or expanded perlite ranges from about 1 wt. % to about 20 wt. %, and more preferably from about 2 wt. % to about 10 wt. %, of the composition.

Other optional additives include thickeners, rheology modifying agents, a synthetic polymer wax that is at least partially water-soluble and a solid at room temperature (as described in U.S. Pat. No. 6,673,144), starches, surfactants, wetting agents, soaps, alkyl benzene sulfonates, pigments, and rust inhibitors. Of course, the inclusion of these components should be based not only on their beneficial effect on the performance of the compositions, but must also not emit or generate formaldehyde in the cured compositions. Further, and while those skilled in the art should be able to determine the amount of each optional component suitable for use in the inventive compositions, additional guidance concerning some of these components is provided in the following paragraphs.

Thickening agents are well-known, and function in part to assist in increasing the viscosity of the composition to desired levels. Illustrative of suitable thickening agents that may be used in the inventive compositions are ethylhyrdoxyethyl cellulose, hydroxypropylmethyl cellulose, methylhydroxypropyl cellulose, hydroxyethylcellulose, cellulose-based gums, such as, for example, xanthan, arabic, alginate, pectin and guar gums, and mixtures thereof. When used, it is preferred that the thickener is a cellulosic thickener. The thickener may be present in any suitable amount, but preferably ranges from about 0.05 wt. % to about 5 wt. %, and more preferably from about 0.1 wt. % to about 2 wt. % of the composition.

Rheology modifying agents also may be included in the inventive compositions to modify the flow behavior of the composition. Suitable rheology agents include, for example, clays, such as attapulgite, sepiolite and kaolin. The rheology agents may be present in any suitable amount, but this amount preferably ranges from about 0.1 wt. % to about 5 wt. % of the composition.

Agents which assist in minimizing cracking in the cured composition also may be included therein. Illustrative of suitable agents include mica, talc, sericite, perlite, and mixtures thereof. If included, this agent preferably ranges from about 0.01 wt. % to about 15 wt. %, and more preferably from about 0.5 wt. % to about 8 wt. %, of the composition.

A synthetic polymer wax that is at least partially water-soluble and a solid at room temperature may be included to provide the composition with a reduced level of air-borne particulates when the cured composition is sanded. If included in the compositions, this component may be desirably present in an amount ranging from about 0.1 wt. % to about 10 wt. % of the composition.

Generally, the uncured compositions of the present invention may have a basic pH. In this regard, the pH of the compositions desirably ranges from about 8 to about 12.

The compositions described herein may be prepared by any suitable method, such methods being well-known to those skilled in the art.

The inventive compositions described herein are useful as joint compounds. These compounds may be used in finishing wallboard joints in new construction and for patching cracks or holes in existing walls. When it is desired to finish joints between abutting edges of wallboard, the area to be finished is coated with the composition. A reinforcing tape is embedded in the composition while it is still wet. When dry (cured), a second coating of composition may be applied to the joint. When the composition is dry, the dry composition may be lightly sanded. If desired, a third coat of the composition may be applied, with the seam drying and being sanded in between. The patching of small holes or imperfections in a wall may repaired by applying one or more coats of the composition thereto, allowing the composition to dry (cure), followed by sanding. Whether finishing joints or patching, the final coat is allowed to dry and is sanded to create a smooth, monolithic surface over the entire wall.

EXAMPLE

An example of a preferred aspect of the invention is provided below.

| Ingredient | Amount (lbs.) | Dry Weight |
|---|---|---|
| Calcium carbonate (Hubercarb S-200) | 2523.00 | 77.32% |
| Perlite (Sil Cell 35 BC) | 405.00 | 12.41% |
| Sepiolite (IMV IGS) | 112.00 | 3.43% |
| Magnesium Alumino Silicate (Min-U-Gel FG) | 70.00 | 2.15% |
| Methyl Cellulose (Walocel MT) | 21.00 | 0.64% |
| Hydroxyethyl cellulose (Cellosize DCS HV US) | 14.00 | 0.43% |
| Wheat starch | 4.00 | 0.12% |
| Sodium nitrite | 2.00 | 0.06% |
| Yellow iron oxide | 1.25 | 0.04% |
| Hydrated lime | 1.25 | 0.04% |
| Vinyl acetate polymer (RayVace 45030 - 60% solids) | 154.96 | 2.85% |
| 1,2-benzisothiazolin-3-one (Nuosept 498) | 16.50 | 0.51% |
| Water | 2937.44 | |

The foregoing preferred aspect of the invention was prepared as a sample and conditioned as previously described herein prior to being subjected to the chamber test under the following chamber conditions:

| Parameter | Symbol | Units | Value |
|---|---|---|---|
| Product exposed area | $A_C$ | $m^2$ | 0.0225 |
| Chamber volume | V | $m^3$ | 0.067 |
| Loading factor | L | $m^2 m^{-3}$ | 0.34 |
| Inlet air flow rate | Q | $m^3 h^{-1}$ | 0.067 |
| Air change rate | a | $h^{-1}$ | 1.00 |
| Temperature | T | °C. | 22.9 |
| Relative humidity | RH | % | 50.8 |

The formaldehyde test results for the conditioned sample under the chamber conditions set forth in the preceding paragraph (with formaldehyde content analyzed with regard to ASTM D 5197-97) were as follows:

| Substance | Chamber Concentration ($\mu g\, m^{-3}$) | Emission Factor ($\mu g\, m^{-2}\, h^{-1}$) |
|---|---|---|
| | 24-h Test Period | |
| Formaldehyde | 1.1 | 3.1 |
| | 48-h Test Period | |
| Formaldehyde | 1.1 | 3.1 |
| | 96-h Test Period | |
| Formaldehyde | 1.1 | 3.3 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Unless otherwise indicated by specific reference or context, and recognizing that certain components may have some water included therein, all weight percentages provided for the components of the inventive compositions herein are based on the weight of the composition prior to the addition of water thereto.

We claim:

1. A drying-type composition comprising water, a filler comprising calcium carbonate, a binder, a biocide comprising an isothiazolinone, and a set retardant, wherein the composition after curing releases some formaldehyde, but wherein the amount of released formaldehyde is no more than about 16 μg m$^{-3}$ (13.5 ppb) of formaldehyde.

2. The composition according to claim 1, wherein the binder is selected from the group consisting of vinyl-, acrylic- and styrene-containing compounds, polymers or copolymers of vinyl-, acrylic- and styrene-containing compounds, starches, and mixtures thereof.

3. The composition according to claim 2, wherein the binder comprises polyvinyl acetates, polyvinyl alcohols, (meth)acrylic polymers, ethylene vinyl acetate polymers, vinyl chloride polymers, styrene acrylic polymers, polystyrenes, polyacrylamides, styrenebutadiene, natural starches, synthetic starches, casein and mixtures thereof.

4. The composition according to claim 1, wherein the binder comprises a polymer latex emulsion.

5. The composition according to claim 4, wherein polymer latex emulsion comprises a vinyl acetate polymer.

6. The composition according to claim 1, wherein the set retardant is present in an amount ranging from about 0.01 to about 10 wt. %, the calcium carbonate is present in an amount ranging from about 20 wt. % to about 95 wt. %, the binder is present in an amount ranging from about 0.1 to about 15 wt. %, the isothiazolinone is present in an amount from about 0.01 to about 5 wt. % and water is present in an amount sufficient to provide the composition with a viscosity of from about 10,000 cps to about 80,000 cps.

7. The composition according to claim 1, wherein the biocide comprises a $C_1$-$C_8$ isothiazolinone.

8. The composition according to claim 7, wherein the biocide comprises a methyl isothiazolinone, an octylisothiazolinone or mixtures thereof.

9. The composition according to claim 1, wherein the amount of formaldehyde released from the cured composition is no more than about 10 μg m$^{-3}$ (8.2 ppb).

10. The composition according to claim 1, wherein the amount of formaldehyde released from the cured composition is no more than about 5 μg m$^{-3}$ (4.1 ppb).

11. The composition according to claim 1, wherein the amount of formaldehyde released from the cured composition is no more than about 2 μg m$^{-3}$ (1.6 ppb).

12. The composition according to claim 9, wherein the binder comprises polyvinyl acetates, polyvinyl alcohols, (meth)acrylic polymers, ethylene vinyl acetate polymers, vinyl chloride polymers, styrene acrylic polymers, polystyrenes, polyacrylamides, styrenebutadiene, natural starches, synthetic starches, casein and mixtures thereof.

13. A method for filling a crevice in a wallboard surface comprising the steps of:
 (a) applying the composition of claim 1 to fill the crevice;
 (b) curing the composition; and
 (c) sanding the composition to provide a smooth surface.

14. The composition according to claim 1, wherein the biocide comprises a benzylisothiazolinone.

* * * * *